(12) United States Patent
Oh et al.

(10) Patent No.: US 11,271,861 B2
(45) Date of Patent: Mar. 8, 2022

(54) VEHICLE COMMUNICATION CONNECTION DEVICE AND METHOD THEREOF

(71) Applicants: HYUNDAI MOTOR COMPANY, Seoul (KR); KIA MOTORS CORPORATION, Seoul (KR)

(72) Inventors: Dong In Oh, Hwaseong-si (KR); Joon Young Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/999,951

(22) Filed: Aug. 21, 2020

(65) Prior Publication Data

US 2021/0119924 A1 Apr. 22, 2021

(30) Foreign Application Priority Data

Oct. 16, 2019 (KR) ........................ 10-2019-0128683

(51) Int. Cl.
| | |
|---|---|
| *H04L 12/859* | (2013.01) |
| *H04L 29/08* | (2006.01) |
| *H04L 47/2475* | (2022.01) |
| *H04L 67/141* | (2022.01) |
| *H04L 67/12* | (2022.01) |

(52) U.S. Cl.
CPC .......... *H04L 47/2475* (2013.01); *H04L 67/12* (2013.01); *H04L 67/141* (2013.01)

(58) Field of Classification Search
CPC ..... H04W 24/02; H04W 48/16; H04W 48/18; H04W 4/46; H04W 4/50; H04W 72/10; H04W 76/10; H04W 88/10; H04W 72/06; H04W 88/08; H04W 88/12; H04W 92/12; H04L 47/2475; G06F 16/24575; G06F 16/24578; G06F 16/335
See application file for complete search history.

(56) References Cited

U.S. PATENT DOCUMENTS

| | | | | |
|---|---|---|---|---|
| 2003/0185219 | A1* | 10/2003 | Maynard | ................. H04L 29/06 |
| | | | | 370/395.32 |
| 2006/0136883 | A1* | 6/2006 | Gebhart | ................ G06F 9/5072 |
| | | | | 717/140 |
| 2018/0317067 | A1* | 11/2018 | Ameixieira | ............. H04W 4/46 |
| 2018/0376357 | A1* | 12/2018 | Tavares Coutinho | .. H04L 67/10 |
| 2019/0319894 | A1* | 10/2019 | Tang | ....................... H04L 29/06 |
| 2020/0110405 | A1* | 4/2020 | Chen | ...................... G06F 9/4411 |
| 2020/0409731 | A1* | 12/2020 | Zhang | ................. G06F 9/45504 |
| 2021/0092018 | A1* | 3/2021 | Fang | ................... H04L 61/3025 |

* cited by examiner

*Primary Examiner* — Backhean Tiv
*Assistant Examiner* — Linh T. Nguyen
(74) *Attorney, Agent, or Firm* — Morgan, Lewis & Bockius LLP (57) ABSTRACT

A vehicle communication connection device and a method thereof are provided. The method includes determining at least one class identifier (CID) level applicable to a target application, determining at least one communication interface (CI) level applicable to the target application, mapping the determined CID level and the determined CI level to a predefined CID/CI mapping table, determining a final CID level to be used for the target application, and determining a final CI level corresponding to the determined final CID level.

17 Claims, 10 Drawing Sheets

VEHICLE COMMUNICATION CONNECTION DEVICE AND METHOD THEREOF

CROSS-REFERENCE TO RELATED APPLICATION

The present application claims priority to and the benefit of Korean Patent Application No. 10-2019-0128683, filed on Oct. 16, 2019, the entire contents of which are incorporated herein by reference.

TECHNICAL FIELD

The present disclosure relates to a vehicle communication connection device and a method thereof, and more particularly, relates to vehicle communication connection technologies capable of determining a communication scheme based on states of applications and communication media loaded into a vehicle to interwork.

BACKGROUND

The statements in this section merely provide background information related to the present disclosure and may not constitute prior art.

With the wide application of computing technology in the vehicle, technology development for safety and convenience of passengers including a driver has proceeding rapidly.

For convenience and safety of a user who uses the vehicle, various sensors and electronic controllers—that is, electronics—have been provided in the vehicle. Particularly, research has been actively conducted in various communication media for providing various applications and a corresponding application service for safety and convenience of a vehicle passenger.

An existing vehicle communication connection is to set communication data and communication media to be separately used for a corresponding application in response to the application loaded into the vehicle.

In other words, because communication data and communication media are set for each application in a fixed format in an existing vehicle communication connection manner, flexibility and efficiency of using resources are degraded for various communication and data transmission environments.

Particularly, when an additional communication medium (or technique) or a data transfer technique is applied, separate correction for each application loaded into the vehicle is unavoidable in an existing manner.

SUMMARY

An aspect of the present disclosure provides a vehicle communication connection device and a method thereof.

Another aspect of the present disclosure provides a vehicle communication connection device for adaptively connecting vehicle communication depending on a characteristic of an application loaded into the vehicle and a state of a communication medium and a method thereof.

Another aspect of the present disclosure provides a vehicle communication connection device for automatically adding a new communication medium and a data transfer technique without separately correcting and setting separate communication data for each application and a method thereof.

The technical problems to be solved by the inventive concept are not limited to the aforementioned problems, and any other technical problems not mentioned herein will be clearly understood from the following description by those skilled in the art to which the present disclosure pertains.

According to an aspect of the present disclosure, a vehicle communication connection method in a vehicle may include determining at least one class identifier (CID) level applicable to a target application, determining at least one communication interface (CI) level applicable to the target application, mapping the determined CID level and the determined CI level to a predefined CID/CI mapping table, determining a final CID level to be used for the target application, and determining a final CI level corresponding to the determined final CID level.

As an embodiment, the CI level corresponding to the CID level may have a priority.

As an embodiment, the method may further include automatically updating the CID/CI table, when the CI is added, changed, or deleted from the vehicle.

As an embodiment, the predefined CID/CI mapping table may be generated based on a plurality of CID levels for each application characteristic, a plurality of CI levels for each data characteristic, or data defining communication media corresponding to the CI levels.

As an embodiment, the generated predefined CID/CI mapping table may include information about a priority for at least one CI level included in the CID levels.

As an embodiment, the generated predefined CID/CI mapping table may include information about whether it is possible to process at least one CI level included in the CID levels in parallel.

As an embodiment, the application characteristic may be classified by including at least one of emergency, safety, disaster, traffic, and entertainment.

As an embodiment, the data characteristic may be classified by including at least one of a transfer rate or a response speed.

As an embodiment, the method may further include determining whether it is possible to process a plurality of final CI levels in parallel, when the final CI level mapped in response to the determined final CID level is plural in number. Data corresponding to the target application may be processed using the plurality of final CI levels capable of being processed in parallel, when it is possible to process the plurality of final CIs as a result of the determination.

As an embodiment, the method may further include processing the data corresponding to the target application using a CI level with a high priority among the plurality of final CI levels, when it is impossible to process the plurality of final CI levels in parallel as a result of the determination.

As an embodiment, the target application may be an application loaded into the vehicle to be executed.

As an embodiment, the determining of the final CID level to be used for the target application may include extracting a feature of the target application, calculating a feature vector for each of the at least one determined CID level based on the extracted feature, and determining a CID level, magnitude of the calculated feature vector of which is smallest, as the final CID level.

As an embodiment, the communication medium corresponding to the CI level may include at least one of a mobile communication modem, a short-range wireless communication modem, or an optical wireless communication modem.

According to another aspect of the present disclosure, a vehicle communication connection device having a hierarchical structure using a processor and a storage medium connected with the processor may include an application layer that determines a class identifier (CI) level of a target application, a management layer that determines a communication interface (CI) level capable of being mapped in response to the determined CID level based on a predefined CID/CI mapping table, and a network layer that has a communication medium corresponding to the determined CI level and processes a wireless signal corresponding to the target application.

As an embodiment, the management layer may include a CI mapping decision unit that determines the CI level capable of being mapped in response to the determined CID level and a CI condition monitoring unit that monitors a state of the communication medium. The CI mapping decision unit may determine a CI level for data processing of the target application based further on the state of the communication medium.

As an embodiment, the device may further include a predefined table automation unit that automatically updates the predefined CID/CI mapping table, when the communication medium is added, changed, or deleted from the network layer.

As an embodiment, the predefined table automation unit may automatically generate the predefined CID/CI mapping table based on a plurality of CID levels for each application characteristic, a plurality of CI levels for each data characteristic, or data defining communication media corresponding to the CI levels.

As an embodiment, the generated predefined CID/CI mapping table may include information about a priority for at least one CI level included in the CID levels.

As an embodiment, the generated predefined CID/CI mapping table may include information about whether it is possible to process at least one CI level included in the CID levels in parallel. The management layer may determine whether it is possible to process a plurality of CI levels in parallel, when the CI level mapped to the determined CID level is plural in number, and may control such that data corresponding to the target application is processed using the plurality of CI levels capable of being processed in parallel, when it is possible to process the plurality of CI levels in parallel as a result of the determination.

As an embodiment, the application layer may include a CID decision unit that extracts a feature of the target application, calculates a feature vector for the CID level based on the extracted feature, and determines at least one CID level to be applied to the target application based on magnitude of the calculated feature vector.

DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 10.

Figure 1:
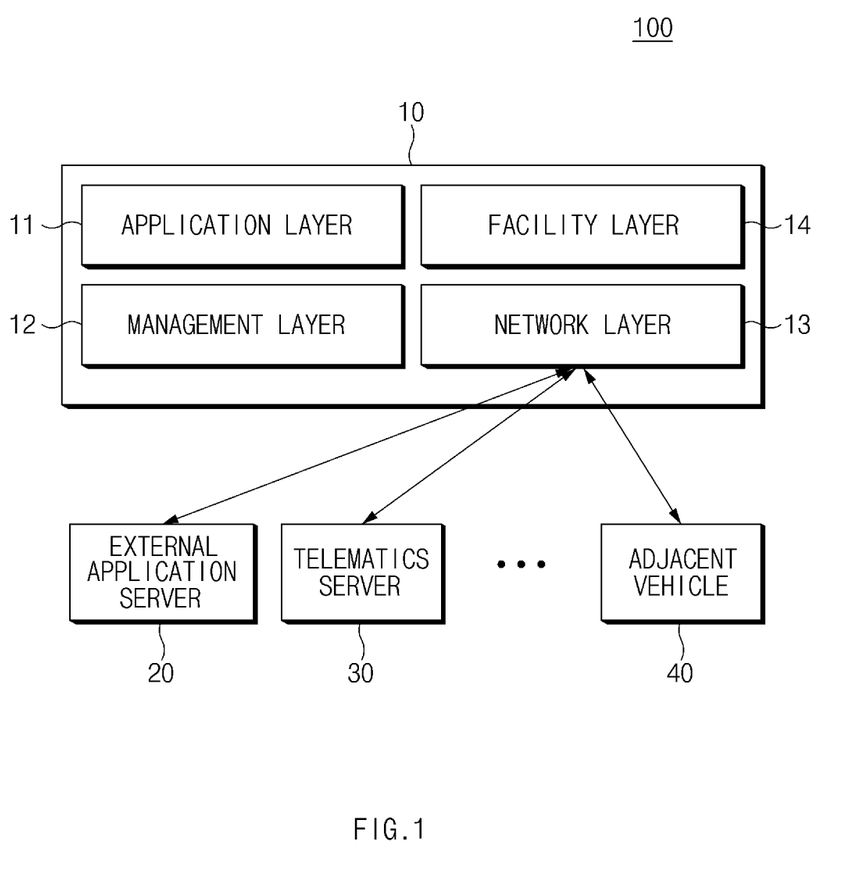
FIG. 1 is a block diagram illustrating a configuration of the entire system for vehicle communication connection in one form of the present disclosure.

FIG. 1 is a block diagram illustrating a configuration of the entire system for vehicle communication connection according to an embodiment.

Referring to FIG. 1, a system 100 may be configured to include a vehicle 10, an external application server 20, a telematics server 30, and an adjacent vehicle 40.

The external application server 20 may exchange information with the vehicle 10 over a wireless network. Herein, the wireless network may include, but is not limited to, a mobile communication network, such as wideband code division multiple access (WCDMA), long term evolution (LTE), LTE-advanced (LTE-A), or new radio (NR), and a short-range wireless access network such as wireless-fidelity (Wi-Fi).

As an example, the external application server 20 may include, but is not limited to, a weather server for providing weather information, a sound source server for providing a sound source streaming service, or the like.

The telematics server 30 may interwork with the vehicle 10 over the wireless network and may provide various connected car services such as an over-the-air (OTA) update service, a real-time traffic information providing service, a real-time my car location sharing service, a server-based speech recognition service, and a home-to-car service.

The adjacent vehicle 40 may exchange a variety of driving information and sensing information with the vehicle 10 through vehicle-to-vehicle (V2V) wireless communication.

As an example, the V2V wireless communication may include, but is not limited to, dedicated short-range communication (DSRC) which is dedicated short-range wireless communication applied to "hi-pass" or the like, wireless access in vehicle environments (WAVE) of a frequency band of 5.825 GHz to 5.9 GHz, to which 3rd generation partnership project (3GPP) standard technology is applied, or the like.

The vehicle 10 may be implemented to have a hierarchical structure roughly including an application layer 11, a management layer 12, a network layer 13, and a facility layer 14.

At least one of the layers of the vehicle 10 may be directly implemented by a hardware module executed in a processor, a software module executed in the processor, or a combination thereof. The software module may reside on a storage medium (i.e., a memory and/or a storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal.

The application layer 11 may be loaded with a program for providing various application services in the vehicle 10.

The application layer 11 may assign a class identifier (CID) for each application depending on a characteristic of an application loaded into the vehicle 10. As an example, when installing or updating a new application in the vehicle 10, the application layer 11 may automatically determine and set a CID corresponding to the application without a separate input of a user.

The application layer 11 may extract a feature based on characteristic information of the newly installed or updated application.

The application layer 11 may perform distance measurement between each CID and the feature. Herein, the distance measurement may be performed by calculating a feature vector value based on similarity between a feature corresponding to each CID and a feature extracted in response to a corresponding application. A value in which the magnitude of a feature vector calculated in response to each CID is smallest may be determined (mapped) as a CID of a corresponding application.

A CID may be a numerical value for classifying importance (level) according to the use of an application, and each level may be associated with a specific service or situation. The CID may be defined such that importance is more increased as a numerical value is lower.

As an example, CID level 1 may be defined as emergency (CID 0), CID level 2 may be defined as safety (CID 1), CID level 3 may be defined as general disaster (CID 2), CID level 4 may be defined as general traffic information (CID 3), and CID level 5 may be defined as entertainment-related (CID 4).

The management layer 12 may monitor the CID for each application, which is determined by the application layer 11.

The management layer 12 may monitor a state of a communication interface (CI) loaded into the network layer 13. As an example, the management layer 12 may determine whether to use each CI—that is, inactive/active—.

When a CI is added/deleted/changed in the network layer 13, the management layer 12 may control a CI register and integration procedure and may automatically update a predefined CID mapping table.

The management layer 12 may dynamically allocate a CI for each application based on a CID of an application currently activated based on the predefined mapping table and current CI state information. In other words, the management layer 12 may perform a CID/CI mapping operation of the activated application.

As a result of the CID/CI mapping, the application layer and the network layer 13 may exchange data through the management layer 12.

The network layer 13 may include a modem for modulating/demodulating a signal for each CI and a radio frequency (RE) front end for transmitting and receiving a wireless signal and may monitor a wireless communication state in real time.

The network layer 13 may record the result of monitoring the wireless communication state in an internal database and may report the result of monitoring the wireless communication state to the management layer 12.

As an example, the network layer 13 may include a mobile communication modem supporting at least one of WCDMA, LTE, or NR, a short-range wireless communication modem supporting DSRC which is a dedicated short-range wireless communication, an optical wireless communication modem supporting infrared ray (IR) communication which is optical wireless communication using an IR, or the like.

The facility layer 14 may monitor resource states and operation states of the application layer 11, the management layer 12, and the network layer 13.

As an example, the facility layer 14 may monitor fault and alarm states of the application layer 11, the management layer 12, and the network layer 13 to generate log data.

When a fault and an alarm occur, the facility layer 14 may provide the external telematics server 30 with a fault and alarm report over the wireless network.

The facility layer 14 may monitor traffic for each CI, which is transmitted and received through the network layer 13.

Figure 2:
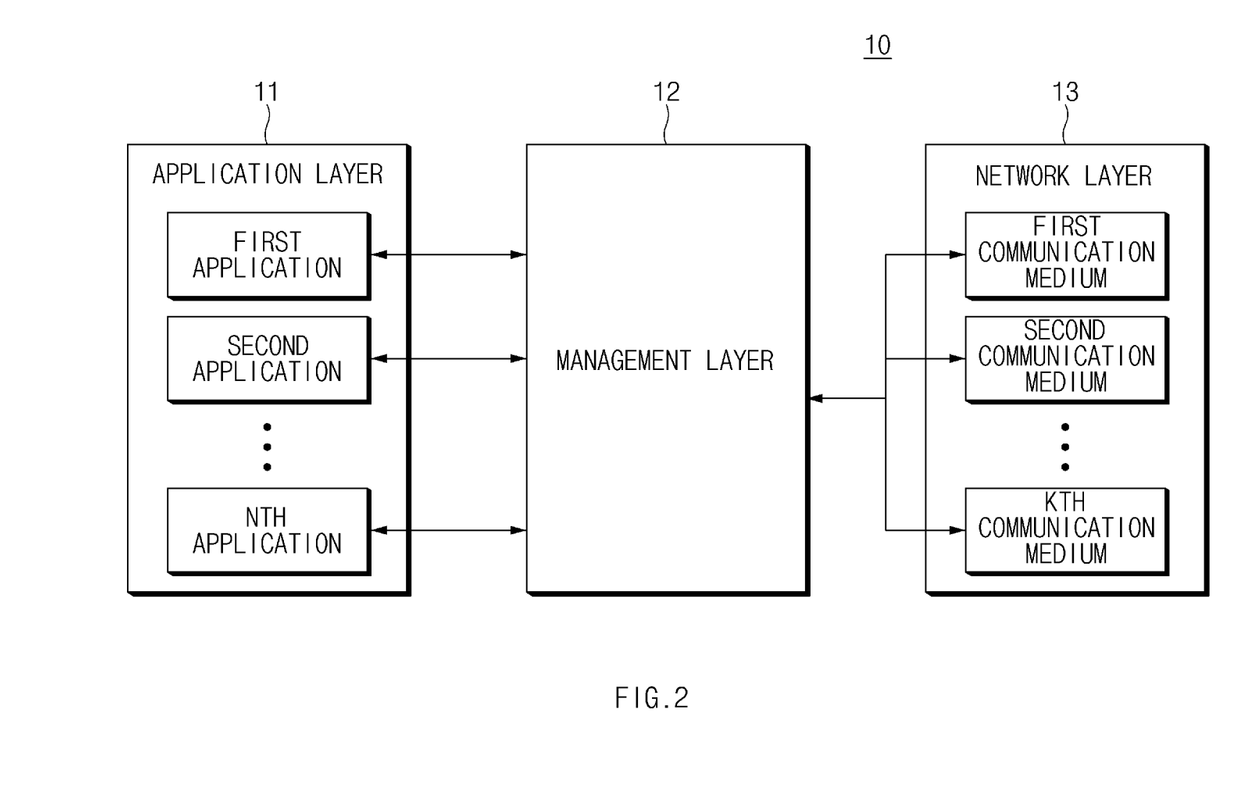
FIG. 2 is a block diagram illustrating a method for setting a communication medium for each application in a vehicle in one form of the present disclosure.

FIG. 2 is a block diagram illustrating a method for setting a communication medium for each application in a vehicle according to an embodiment.

Referring to FIG. 2, an application layer 11 of a vehicle 10 may be loaded with first to Nth applications, and a network layer 13 may be provided with first to Kth communication media—that is, CIs or communication modems—.

The management layer 12 may dynamically map a CI to be used for each application based on the CID for each application, which is determined by the application layer 11, and the CI state information reported from the network layer 13.

The management layer 12 may generate and manage a CID/CI mapping table defining a CI allocable for each CID level in order of priority.

The management layer 12 may control to allocate a plurality of CIs based on a characteristic for each application.

An embodiment of the present disclosure may provide the vehicle communication connection device capable of deviating from an existing manner where the user directly sets a communication medium to be used for each application loaded into the vehicle and adaptively generating a CID/CI mapping table based on current states of an application and a communication medium internally in the vehicle to map a communication medium for each application.

Figure 3:
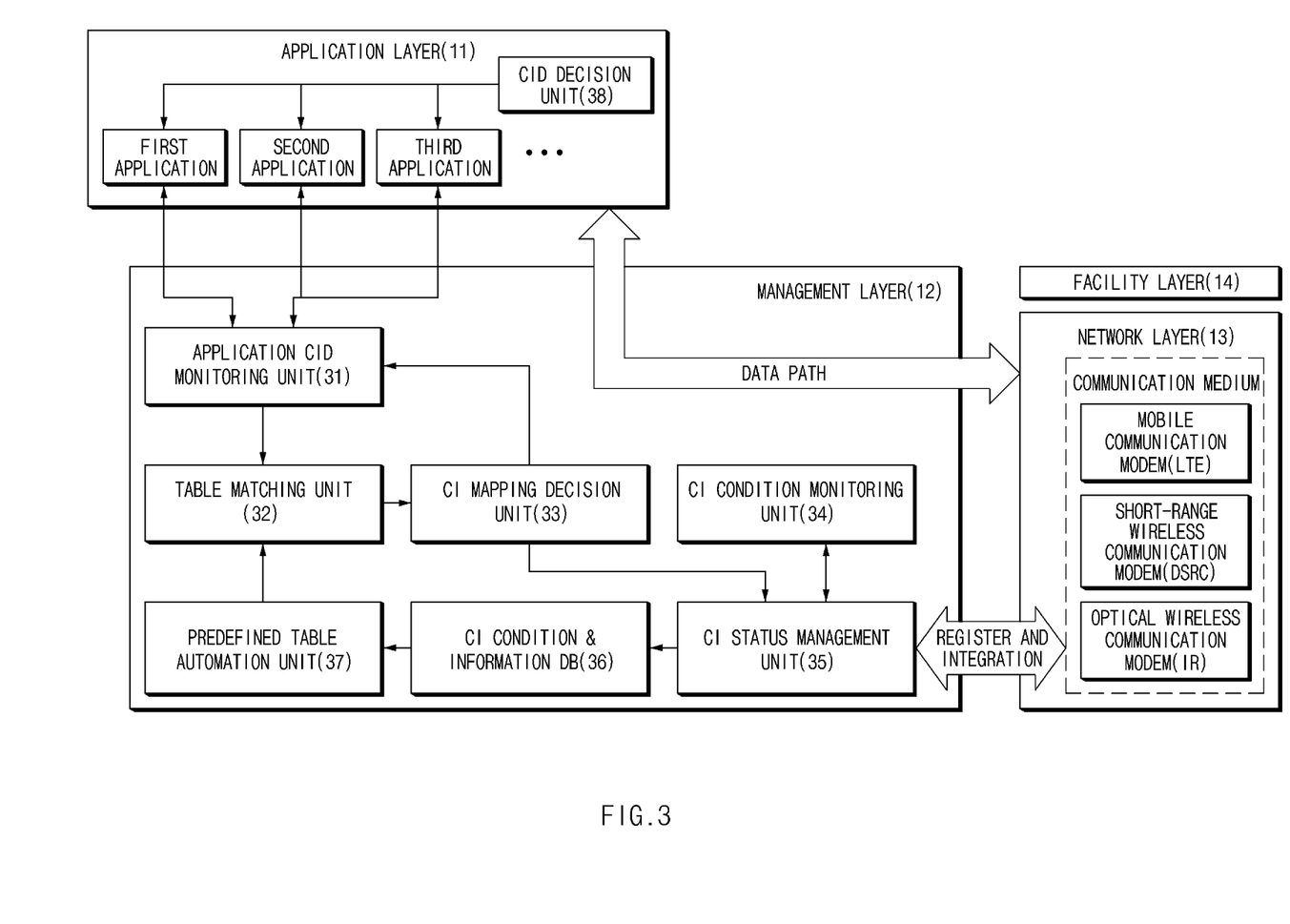
FIG. 3 is a block diagram illustrating a detailed structure of a management layer in a vehicle in one form of the present disclosure.

FIG. 3 is a block diagram illustrating a detailed structure of a management layer in a vehicle according to an embodiment.

Referring to FIG. 3, a management layer 12 may be configured to include an application CID monitoring unit 31, a table matching unit 32, a CI mapping decision unit 33, a CI condition monitoring unit 34, a CI status management unit 35, a CI condition & information DB 36, and a predefined table automation unit 37.

The application CID monitoring unit 31 may monitor a CID allocation state for each application, which is determined by a CID decision unit 38 of an application layer 11.

The CI condition monitoring unit 34 may monitor whether a CI supported by a network layer 13 is activated.

The CI status management unit 35 may perform a management and operation function for a current CI status.

As an example, the CI status management unit 35 may perform a CI status management function and a CI register and integration function. When a new CI is added to the network layer 13, when an old CI is removed from the network layer 13, or when a characteristic is changed due to an upgrade of an old CI, the CI status management unit 35 may monitor a situation where the network layer 13 is changed and may update the CI condition & information DB 36. Furthermore, the CI status management unit 35 may obtain CI condition monitoring information from the CI condition monitoring unit 34 to update the CI condition & information DB 36.

The predefined table automation unit 37 may automatically generate a predefined CID/CI mapping table with reference to the CI condition & information DB 36.

The table matching unit 32 may match the monitored application CID and priority to the predefined CID/CI mapping table to determine a CID applicable to a currently activated application and may identify a CI allocable to the CID.

The CI mapping decision unit 33 may determine a CI actually applied for each monitored application. The CI mapping decision unit 33 may determine whether the identified CI corresponding to the CID determined to be applied to a corresponding application is plural in number, may determine whether it is possible to process the plurality of CIs in parallel, and may allocate the plurality of CIs to the application when it is possible to process the plurality of CIs in parallel.

The CI mapping decision unit 33 may transmit information about the CI finally allocated for each application to the CI status management unit 35.

The CI status management unit 35 may request the network layer 13 to allocate a corresponding CI resource based on the final CI allocation information for each application, which is received from the CI mapping decision unit 33.

Furthermore, the CI status management unit 35 may set a data path for each application between the application layer 11 and the network layer 13 based on the final CI allocation information for each application, which is received from the CI mapping decision unit 33.

Figure 4:
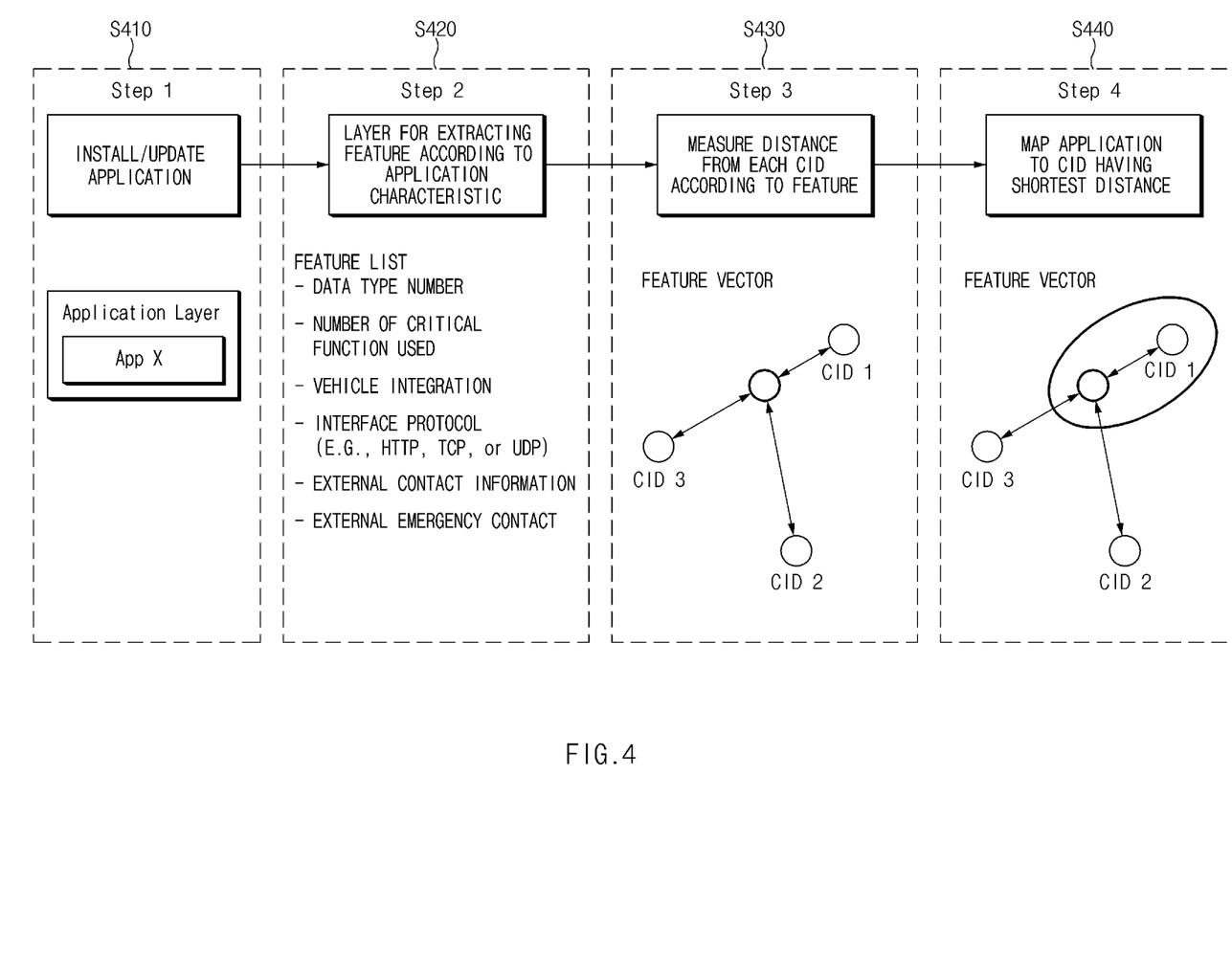
FIG. 4 is a signal sequence diagram illustrating a CID decision procedure in an application layer in one form of the present disclosure.

FIG. 4 is a signal sequence diagram illustrating a CID decision procedure in an application layer according to an embodiment.

Referring to FIG. 4, in S410, a new application may be installed in an application layer 11 or an old application may be updated to a new version in the application layer 11 (Step 1).

In S420, the application layer 11 may extract features according to a characteristic of a corresponding application (Step 2).

As an example, the extracted features may include, but are not limited to, a data type number, a number of critical function used, whether there is vehicle integration, an interface protocol (e.g., hypertext transfer protocol (HTTP), transmission control protocol (TCP), or user datagram protocol (UDP)), external contact information, external emergency contact, and the like.

In S430, the application layer 11 may measure a distance from each CID according to the extracted features (Step 3).

In S440, the application layer 11 may determine a CID, which has the shortest distance as a result of the distance measurement, as a CID corresponding to a corresponding application (Step 4).

The application layer 11 may determine a plurality of CIDs, each where a difference between the measured distances is less than or equal to a reference value, as CIDs corresponding to a corresponding application. As an example, the application layer 11 may determine two or three CIDs, each where the magnitude of a feature vector is less than the reference value, as CIDs allocable to a corresponding application.

Figure 5:
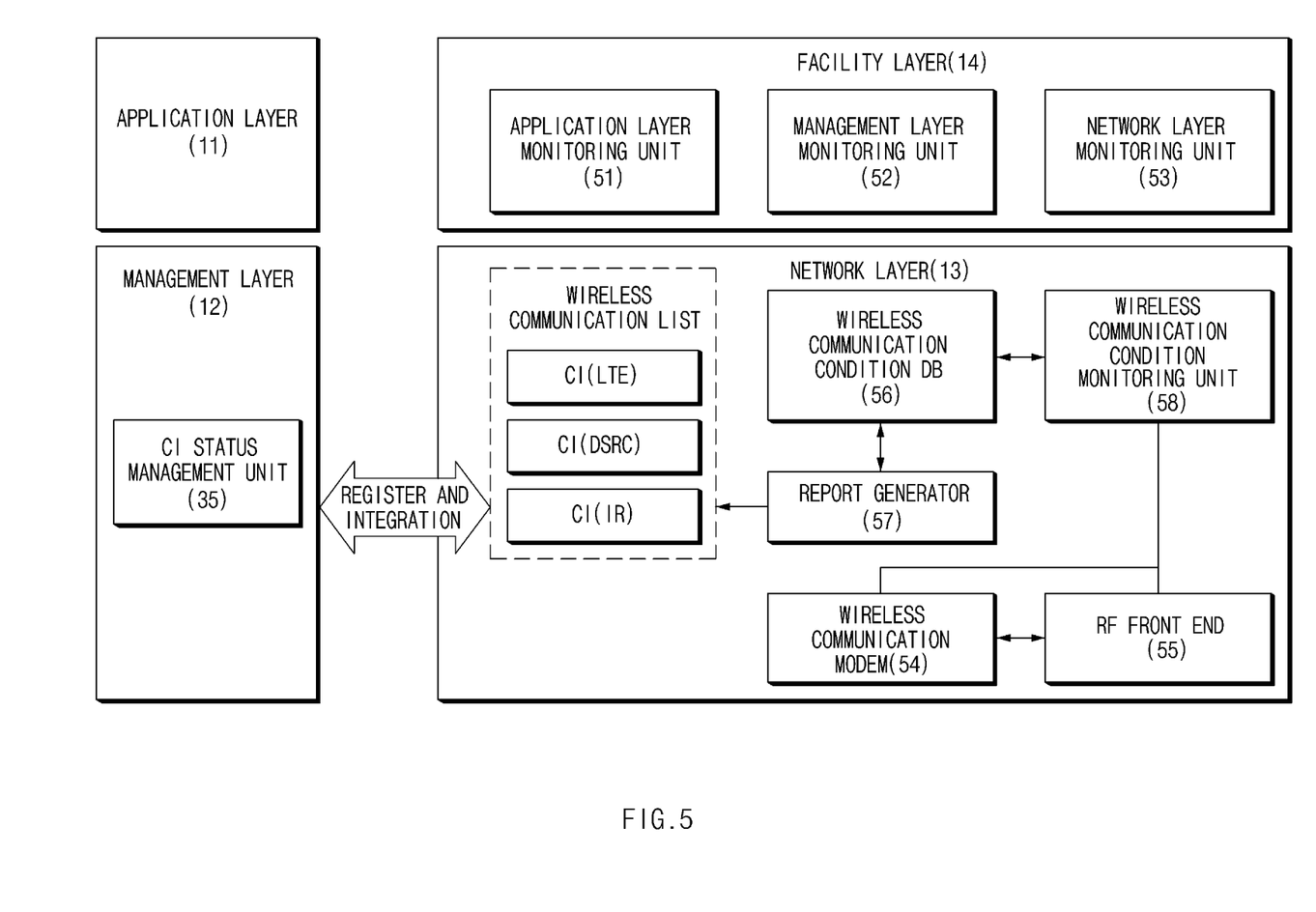
FIG. 5 is a block diagram illustrating a detailed structure of a facility layer and a network layer in a vehicle in one form of the present disclosure.

FIG. 5 is a block diagram illustrating a detailed structure of a facility layer and a network layer in a vehicle according to an embodiment.

Referring to FIG. 5, the facility layer 14 may include an application layer monitoring unit 51, a management layer monitoring unit 52, and a network layer monitoring unit 53.

A network layer 13 may be configured to include a wireless communication modem 54, an RF front end 55, a wireless communication condition monitoring unit 58, a wireless communication condition DB 56, and a report generator 57.

The application layer monitoring unit 51 may monitor resource allocation and various states of the application layer 11. As an example, the application layer monitoring unit 51 may monitor information about the number and types of applications activated in the application layer 11, a CPU occupation state for each application, a memory use state for each application, a data throughput for each application, a fault and alarm state, or the like, but not limited thereto.

The management layer monitoring unit 52 may monitor resource allocation and various states of the management layer 12.

The network layer monitoring unit 53 may monitor resource allocation and various states of the network layer 13.

As an example, the network layer monitoring unit 53 may monitor a driving state of the wireless communication modem 54 provided in the network layer 13, quality and traffic volume of a signal transmitted and received via the RF front end 55, or the like.

The wireless communication modem 54 may modulate data received from the application layer 11 or may demodulate a signal received via the RF front end 55 and may transmit the demodulated signal to the application 11. As an example, the wireless communication modem 54 may include a mobile communication modem (e.g., an LTE modem), a short-range wireless communication modem (e.g., a DSRC modem), an optical wireless communication modem (e.g., an IR modem), or the like.

The wireless communication condition monitoring unit 58 may monitor a driving state of the wireless communication modem 54 or quality of a signal transmitted and received via the RF front end 55 and may record the monitored result in the wireless communication condition DB 56.

The report generator 57 may generate a certain wireless communication condition report including a currently activated wireless communication list and may transmit the wireless communication condition report to the CI status management unit of the management layer 12. As an example, the wireless communication condition report may include wireless communication condition information monitored for each application. Herein, the wireless communication condition information may include, but is not limited to, a signal to noise ratio, traffic volume, a transmission rate, a transmission error rate, or the like.

Figure 6:
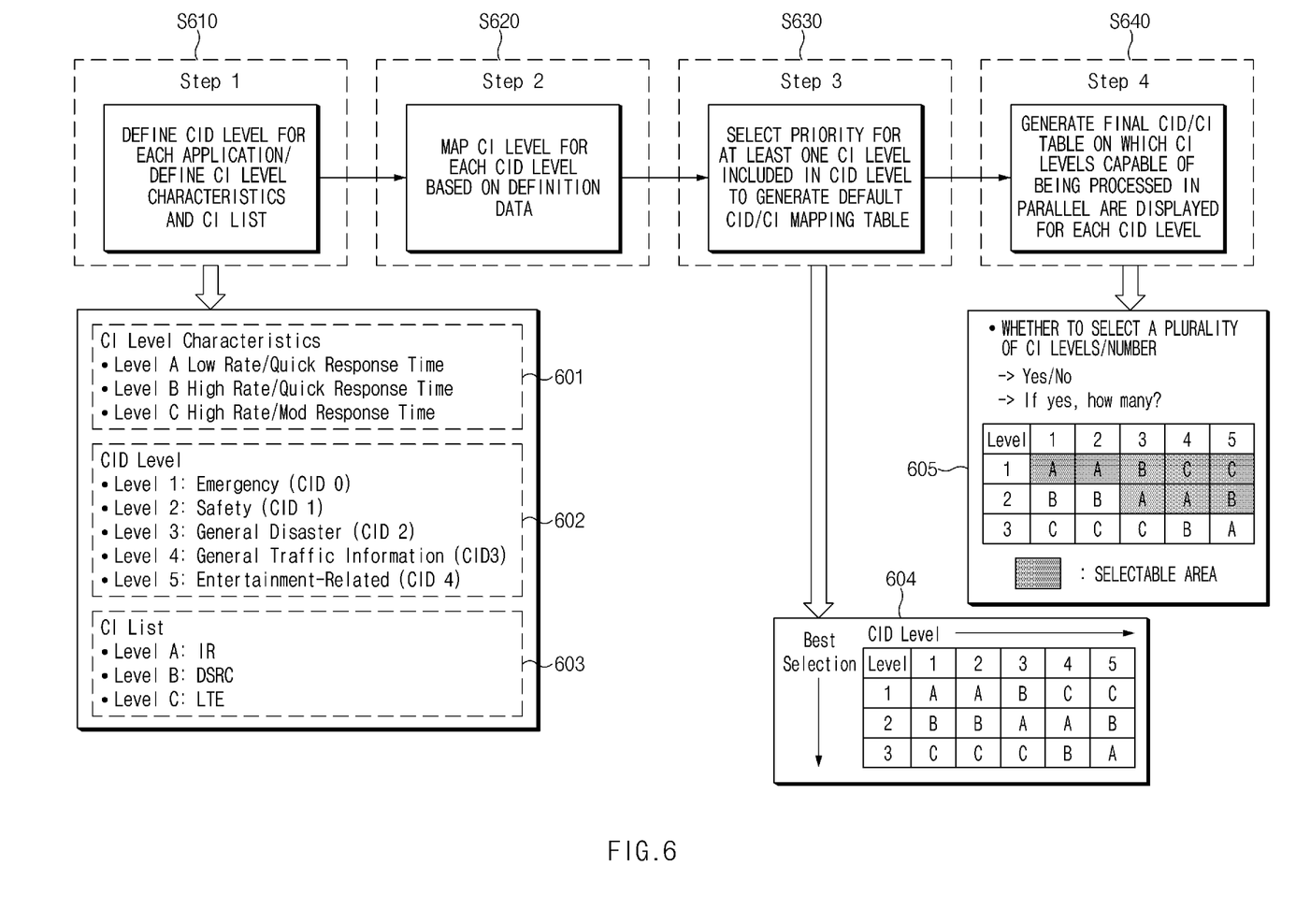
FIG. 6 is a signal sequence diagram illustrating a procedure of generating a CID/CI mapping table in one form of the present disclosure.

FIG. 6 is a signal sequence diagram illustrating a procedure of generating a CID/CI mapping table according to an embodiment.

Referring to FIG. 6, a vehicle according to an embodiment may define a CI level with regard to a data transfer rate and a response time characteristic as shown in reference numeral 601 and may map a corresponding wireless communication scheme to the defined CI level as shown in reference numeral 603. As shown in reference numeral 602, in S610, the vehicle may define a CID level depending on an application characteristic and may allocate a corresponding CID value to the defined CID level (Step 1).

As an example, the CI level may be mapped to have a quicker response time and a lower data transfer rate as the CID level is lower and have a higher data transfer rate irrespective of a response speed as the CID level is higher.

In S620, the vehicle may map a CI level applicable (allocable) for each CID level based on the data defined in S610 (Step 2). In S630, the vehicle may assign a priority to at least one CI level applicable in the CID level to automatically generate a default CID/CI mapping table as shown in reference numeral 604 (Step 3).

In S640, the vehicle may select and define a CI level capable of being processed in parallel for each CID level, and, as shown in reference numeral 605, may generate a final CID/CI mapping table on which the CI level capable of being processed in parallel is displayed (Step 4).

As an example, the final CID/CI mapping table may be automatically generated in the vehicle, such that there is a lower probability of being processed in parallel as the CID level is lower and such that there is a higher probability of being processed in parallel as the CID level is higher.

When there is a change in CID and CI due to an update of an existing vehicle system, addition of a wireless communication modem, and the like, rather than a CID/CI mapping table which is handwritten by a person after he or she directly identify changed records, an embodiment of the present disclosure may monitor CID and CI changed records and states in the vehicle and may automatically generate and update a CID/CI mapping table depending on an internal algorithm based on the monitored result.

Figure 7:
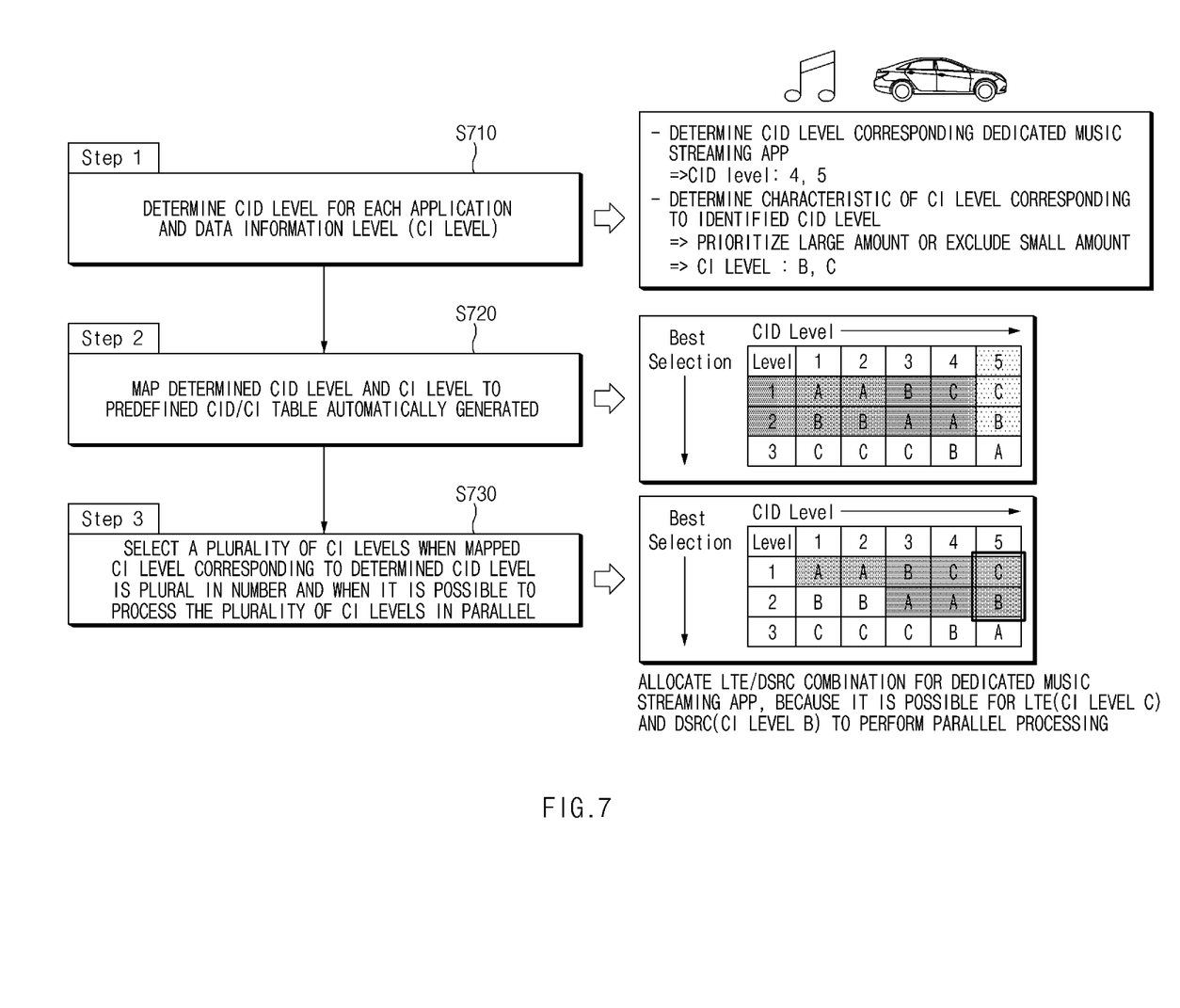
FIG. 7 is a drawing illustrating an example of using a CID/CI mapping table in one form of the present disclosure.

FIG. 7 is a drawing illustrating an example of using a CID/CI mapping table according to an embodiment.

Referring to FIG. 7, in S710, a vehicle may determine a CID level and a data information level—that is a CI level— for each application (Step 1).

As an example, when a dedicated music streaming app loaded into the vehicle is run, the vehicle may determine and identify a CID level corresponding to the dedicated music streaming app. Herein, the CID level corresponding to the dedicated music streaming app may be determined as 4 and 5. The vehicle may determine a characteristic of a CI level corresponding to the identified CID level as prioritizing large amount and excluding small amount and may determine a CI level capable of being mapped to the determined CID level as B or C.

In S720, the vehicle may map the determined CID level and the determined CI level to a predefined CID/CI mapping table automatically generated (Step 2).

In S730, when the CID level mapped in response to the determined CID level is plural in number and when it is possible for a wireless communication module corresponding to the CI level to process the plurality of CI levels in parallel for music streaming, the vehicle may select the plurality of CIs (Step 3).

As an example, because it is possible for LTE (CI level C) and DSRC (CI level B) to perform parallel processing, the vehicle may allocate an LTE/DSRC combination for the dedicated music streaming app.

Figure 8:
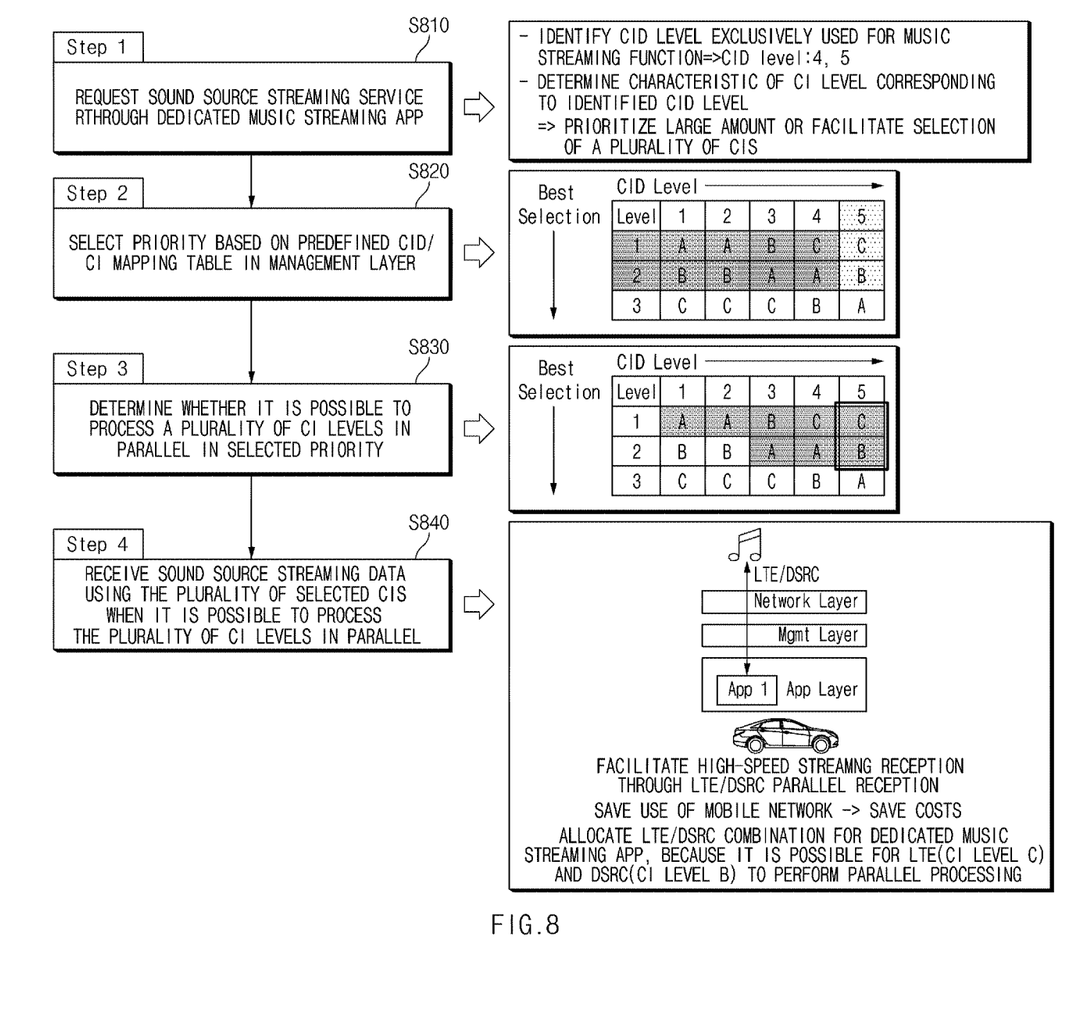
FIG. 8 is a drawing illustrating an example of using a CID/CI mapping table in one form of the present disclosure.

FIG. 8 is a drawing illustrating an example of using a CID/CI mapping table according to another embodiment.

Referring to FIG. 8, in S810, when a sound source streaming service is requested through a dedicated music streaming app, the vehicle may identify a CID level exclusively used for a music streaming function and may determine a characteristic of a CI level corresponding to the identified CID level as prioritizing large amount and as facilitating selection of a plurality of CIs (Step 1).

Herein, the CID level corresponding to the dedicated music streaming app may be determined as 4 and 5.

In S820, a management layer 12 of the vehicle may select a priority based on a predefined CID/CI mapping table (Step 2).

As an example, the management layer 12 may determine a CID level for sound source streaming as 5 and may select CI levels C and B, priority levels of which are 1 and 2.

In S830, the vehicle may determine whether it is possible to process a plurality of CI levels in parallel in the selected priority (Step 3).

In S840, when it is possible to process the plurality of CI levels in parallel as a result of the determination, the vehicle may receive sound source streaming data from a corresponding server using the plurality of selected CIs (Step 4).

As an example, because it is possible for LTE (CI level C) and DSRC (CI level B) to perform parallel processing, the vehicle may allocate an LTE/DSRC combination for the dedicated music streaming app.

Figure 9:
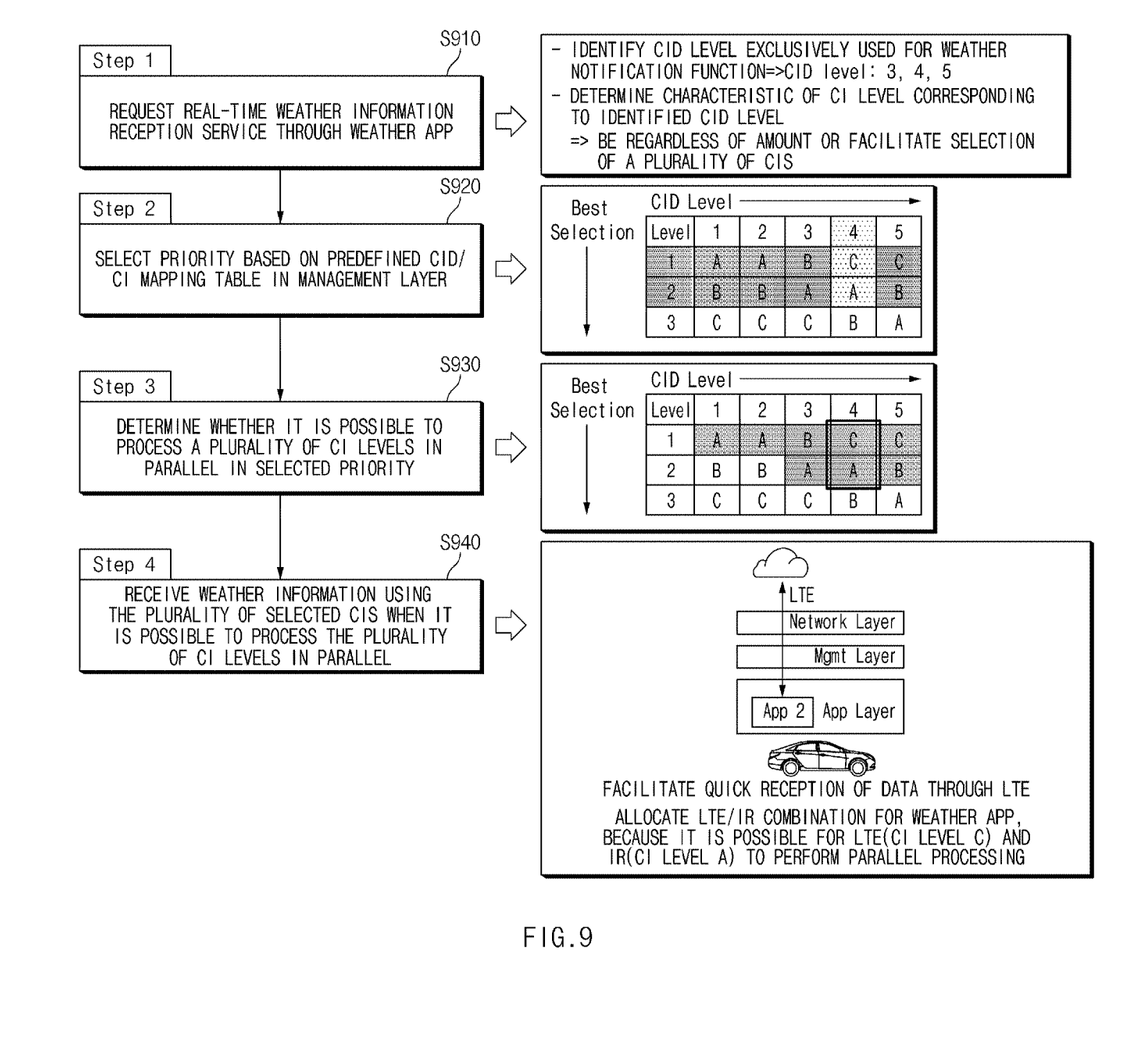
FIG. 9 is a drawing illustrating an example of using a CID/CI mapping table in one form of the present disclosure.

FIG. 9 is a drawing illustrating an example of using a CID/CI mapping table according to another embodiment.

Referring to FIG. 9, in S910, when a weather information reception service is requested through a weather app, the vehicle may identify a CID level exclusively used for a weather notification function and may determine a characteristic of a CI level corresponding to the identified CID level as being regardless of amount and as facilitating selection of a plurality of CIs (Step 1).

As an example, the CID level corresponding to the weather app may be determined as 3, 4 and 5.

In S920, a management layer 12 of the vehicle may select a priority based on a predefined CID/CI mapping table (Step 2).

As an example, the management layer 12 may determine a CID level for receiving weather information as 4 and may select CI levels C and A, priority levels of which are 1 and 2.

In S930, the vehicle may determine whether it is possible to process a plurality of CI levels in parallel in the selected priority.

In S940, when it is possible to process the plurality of CI levels in parallel as a result of the determination, the vehicle may receive weather information from a corresponding server using the plurality of selected CIs (Step 4).

As an example, because it is possible for LTE (CI level C) and IR (CI level A) to perform parallel processing, the vehicle may allocate an LTE/IR combination for the weather app.

Figure 10:
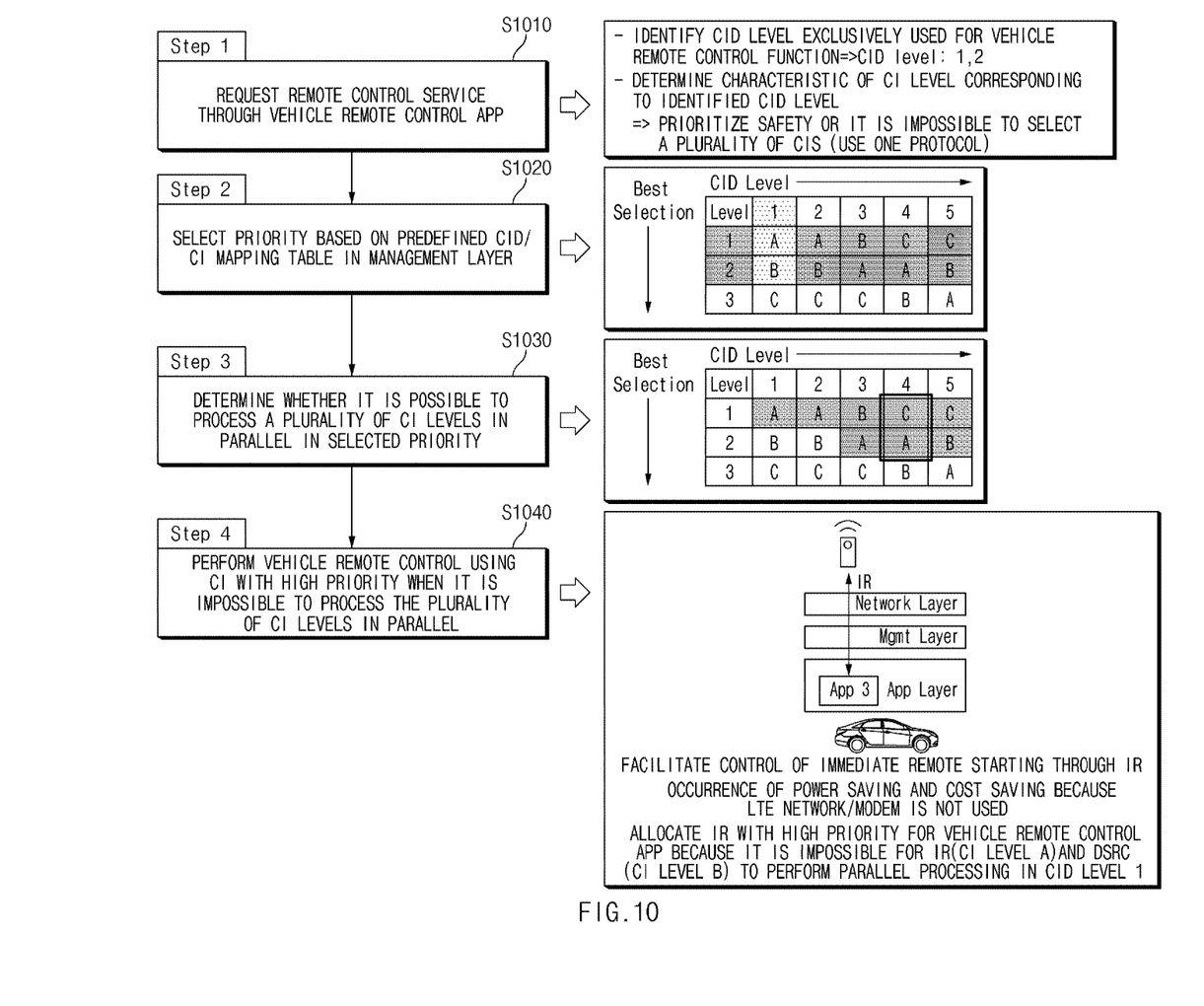
FIG. 10 is a drawing illustrating an example of using a CID/CI mapping table in one form of the present disclosure.

FIG. 10 is a drawing illustrating an example of using a CID/CI mapping table according to another embodiment.

Referring to FIG. 10, in 51010, when a remote control service is requested through a vehicle remote control app, the vehicle may identify a CID level exclusively used for a vehicle remote control function and may determine a characteristic of a CI level corresponding to the identified CID level as prioritizing safety and as it is impossible to select a plurality of CIs (Step 1).

As an example, the CID level corresponding to the vehicle remote control app may be determined as 1 and 2.

In S1020, a management layer 12 of the vehicle may select a priority based on a predefined CID/CI mapping table (Step 2).

As an example, the management layer 12 may determine a CID level for vehicle remote control as 1 and may select CI levels A and B, priority levels of which are 1 and 2.

In S1030, the vehicle may determine whether it is possible to process a plurality of CI levels in parallel in the selected priority (Step 3).

In S1040, when it is impossible to process the plurality of CI levels in parallel as a result of the determination, the vehicle may perform vehicle remote control using CI level A with a high priority among the plurality of selected CI levels (Step 4).

As an example, because it is impossible for IR (CI level A) and DSRC (CI level B) to perform parallel processing in CID level 1, the vehicle may allocate an IR with a high priority for the vehicle remote control app.

An embodiment of the present disclosure may provide a vehicle communication connection device and a method thereof.

An embodiment of the present disclosure may provide a vehicle communication connection device capable of adaptively selecting and connecting a communication medium depending on a characteristic of an application loaded into the vehicle and a state of the communication medium and a method thereof, thus improving flexibility and efficiency of using resources in various communication and data transmission environments.

Furthermore, an embodiment of the present disclosure may provide a vehicle communication connection device capable of automatically adding a new communication medium and a data transfer technique without separately correcting and setting separate communication data for each application and a method thereof, thus minimizing maintenance and upgrade costs.

Furthermore, an embodiment of the present disclosure may adaptively select and use a communication medium depending on a characteristic of an application and a state of the communication medium, thus saving power used by communication units in the vehicle.

In addition, an embodiment of the present disclosure may control to use direct communication rather than a mobile communication network depending on a characteristic of an application and a state of a communication medium, thus reducing congestion possibility on the network and saving communication costs.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A vehicle communication connection method in a vehicle having a plurality of communication media, the method comprising:
    determining at least one class identifier (CID) level applicable to a target application;
    determining at least one communication interface (CI) level applicable to the target application;
    mapping the determined CID level and the determined CI level to a predefined CID/CI mapping table;
    determining a final CID level to be used for the target application; and
    determining a final CI level corresponding to the determined final CID level, and wherein the mapping of the determined CID level and the determined CI level includes:
    generating the predefined CID/CI mapping table based on a plurality of CID levels for each application characteristic, a plurality of CI levels for each data characteristic, or data defining communication media corresponding to the CI levels, and
    wherein the generated predefined CID/CI mapping table includes information about whether it is possible to process at least one CI level included in the CID levels in parallel.

2. The method of claim 1, wherein the CI level corresponding to the CID level has a priority.

3. The method of claim 1, wherein the method further comprises:
    automatically updating the CID/CI table when the CI is added, changed, or deleted from the vehicle.

4. The method of claim 1, wherein the generated predefined CID/CI mapping table includes information about a priority for at least one CI level included in the CID levels.

5. The method of claim 1, wherein the generation of the predefined CID/CI mapping table includes:
    classifying the application characteristic by including at least one of emergency, safety, disaster, traffic, or entertainment.

6. The method of claim 1, wherein the generation of the predefined CID/CI mapping table includes:
    classifying the data characteristic by including at least one of a transfer rate or a response speed.

7. The method of claim 1, wherein the method further comprises:

when the final CI level mapped in response to the determined final CID level is plural in number, determining whether it is possible to process a plurality of final CI levels in parallel; and when it is determined to be possible to process the plurality of final CI levels in parallel, processing data corresponding to the target application using the plurality of final CI levels.

8. The method of claim 7, wherein the method further comprises:

when it is determined to be impossible to process the plurality of final CI levels in parallel, processing the data corresponding to the target application using a CI level with a high priority among the plurality of final CI levels.

9. The method of claim 1, wherein the target application is an application loaded into the vehicle to be executed.

10. The method of claim 1, wherein the plurality of communication media corresponding to the CI level includes at least one of a mobile communication modem, a short-range wireless communication modem, or an optical wireless communication modem.

11. A vehicle communication connection method in a vehicle having a plurality of communication media, the method comprising:

determining at least one class identifier (CID) level applicable to a target application;

determining at least one communication interface (CI) level applicable to the target application;

mapping the determined CID level and the determined CI level to a predefined CID/CI mapping table;

determining a final CID level to be used for the target application; and determining a final CI level corresponding to the determined final CID level, and wherein the determination of the final CID level to be used for the target application includes:

extracting a feature of the target application;

calculating a feature vector for each of the at least one determined CID level based on the extracted feature; and determining that a CID level having the smallest feature vector is the final CID level.

12. A vehicle communication connection device having a hierarchical structure, the device comprising:

an application layer configured to determine a class identifier (CID) level of a target application;

a management layer configured to determine a communication interface (CI) level mapped in response to the determined CID level based on a predefined CID/CI mapping table; and a network layer configured to have a communication medium corresponding to the determined CI level and process a wireless signal corresponding to the target application, and wherein the management layer is configured to:

generate the predefined CID/CI mapping table based on a plurality of CID levels for each application characteristic, a plurality of CI levels for each data characteristic, or data defining communication media corresponding to the CI levels, and wherein the generated predefined CID/CI mapping table includes information about whether it is possible to process at least one CI level included in the CID levels in parallel.

13. The device of claim 12, wherein the management layer is configured to:

determine the CI level mapped in response to the determined CID level;

monitor a state of the communication medium; and determine a CI level for data processing of the target application based on the state of the communication medium.

14. The device of claim 13, wherein the management layer is configured to automatically update the predefined CID/CI mapping table, when the communication medium is added, changed, or deleted from the network layer.

15. The device of claim 12, wherein the generated predefined CID/CI mapping table includes information about a priority for at least one CI level included in the CID levels.

16. The device of claim 12, wherein the management layer is configured to:

determine whether it is possible to process a plurality of CI levels in parallel when the CI level mapped to the determined CID level is plural in number; and process data corresponding to the target application using the plurality of CI levels in parallel when it is determined to be possible to process the plurality of CI levels in parallel.

17. A vehicle communication connection device having a hierarchical structure, the device comprising:

an application layer configured to determine a class identifier (CID) level of a target application;

a management layer configured to determine a communication interface (CI) level mapped in response to the determined CID level based on a predefined CID/CI mapping table; and a network layer configured to have a communication medium corresponding to the determined CI level and process a wireless signal corresponding to the target application, and wherein the application layer configured to:

extract a feature of the target application;

calculate a feature vector for the CID level based on the extracted feature; and determine at least one CID level to be applied to the target application based on magnitude of the calculated feature vector.

* * * * *